(12) United States Patent
Oreizy et al.

(10) Patent No.: US 7,593,988 B2
(45) Date of Patent: Sep. 22, 2009

(54) SYSTEMS AND METHODS FOR MULTIPARTY SESSION INVITE

(75) Inventors: Peyman Oreizy, Kirkland, WA (US); Arvind Kumar, Redmond, WA (US); Mark Thomas Schofield, Redmond, WA (US); Kevin R. Moore, Seattle, WA (US); Sean Olin Blagsvedt, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 676 days.

(21) Appl. No.: 10/691,922

(22) Filed: Oct. 23, 2003

(65) Prior Publication Data

US 2005/0091301 A1 Apr. 28, 2005

(51) Int. Cl.
*G06F 15/16* (2006.01)

(52) U.S. Cl. .................. 709/205; 715/751; 715/752; 715/753; 715/754; 715/755; 709/204; 709/225; 709/230

(58) Field of Classification Search .............. 709/204, 709/205, 225, 230; 715/751–759
See application file for complete search history.

(56) References Cited

U.S. PATENT DOCUMENTS

| | | | | |
|---|---|---|---|---|
| 5,577,069 A * | 11/1996 | Lau et al. | | 375/242 |
| 5,737,108 A * | 4/1998 | Bunch et al. | | 398/135 |
| 6,028,866 A * | 2/2000 | Engel et al. | | 370/461 |
| 6,097,705 A * | 8/2000 | Ben-Michael et al. | | 370/315 |
| 6,179,713 B1 * | 1/2001 | James et al. | | 463/42 |
| 6,295,550 B1 * | 9/2001 | Choung et al. | | 709/204 |
| 6,442,590 B1 * | 8/2002 | Inala et al. | | 709/204 |
| 6,466,969 B1 * | 10/2002 | Bunney et al. | | 709/206 |
| 6,480,885 B1 * | 11/2002 | Olivier | | 709/207 |
| 6,519,629 B2 * | 2/2003 | Harvey et al. | | 709/204 |
| 6,530,840 B1 * | 3/2003 | Cuomo et al. | | 463/42 |
| 6,690,654 B2 * | 2/2004 | Elliott et al. | | 370/260 |
| 6,748,420 B1 * | 6/2004 | Quatrano et al. | | 709/205 |
| 6,996,605 B2 * | 2/2006 | Low et al. | | 709/204 |
| 7,000,019 B2 * | 2/2006 | Low et al. | | 709/227 |
| 7,240,093 B1 * | 7/2007 | Danieli et al. | | 709/205 |
| 2002/0059379 A1 * | 5/2002 | Harvey et al. | | 709/205 |
| 2002/0065097 A1 * | 5/2002 | Brockenbrough et al. | ... | 455/552 |
| 2002/0094870 A1 * | 7/2002 | Murray | | 463/42 |
| 2002/0140625 A1 * | 10/2002 | Kidney et al. | | 345/1.1 |
| 2003/0014489 A1 * | 1/2003 | Inala et al. | | 709/204 |
| 2003/0131061 A1 * | 7/2003 | Newton et al. | | 709/206 |
| 2004/0198403 A1 * | 10/2004 | Pedersen et al. | | 455/517 |
| 2004/0210659 A1 * | 10/2004 | Taylor | | 709/227 |

(Continued)

OTHER PUBLICATIONS

Web ProForum Tutorials, http://www.iec.org, 2004, 10 pages.

(Continued)

*Primary Examiner*—Kenny S Lin
*Assistant Examiner*—Tauqir Hussain
(74) *Attorney, Agent, or Firm*—Woodcock Washburn LLP

(57) ABSTRACT

A messaging system is provided whereby a message indicative of an invitation to collaboratively execute an application can be sent from one of the computing object to an intermediary system whereby the message is multicast to the other ones of the plurality of computing objects. The invitation message can be accepted by the other computing objects to cause the first object to launch the corresponding application. The other computing objects also launch versions of the application and exchange addressing information with the first application so that a multiparty application execution can be established.

20 Claims, 8 Drawing Sheets

U.S. PATENT DOCUMENTS

2005/0027382 A1* 2/2005 Kirmse et al. .................. 700/91
2005/0209002 A1* 9/2005 Blythe et al. ................... 463/42
2006/0178216 A1* 8/2006 Shea et al. .................... 463/42
2007/0055728 A1* 3/2007 Shea et al. .................. 709/204

OTHER PUBLICATIONS

Yang, B. et al., "Comparing Hybrid Peer-to-Peer Systems," *Proceedings of the 27th VLDB Conference*, Roma, Italy, 2001, 10 pages.

* cited by examiner

SYSTEMS AND METHODS FOR MULTIPARTY SESSION INVITE

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document Copyright© 2003, Microsoft Corp.

FIELD OF THE INVENTION

The present invention relates generally to the field of computing. More particularly, the invention relates to a system and method for multiparty collaboration.

BACKGROUND OF THE INVENTION

A variety of intermediary services enables a user to learn about the presence of other computer user's on a network such as an Intranet or the Internet, and to communicate with them in real-time. This functionality is commonly referred to as "Instant Messaging" (IM). Some of the services that the IM services provide to clients are:

Authenticated user logon.
Adding and deleting members of the user's contact list.
Changing the user's on-line state.
Receipt of asynchronous, real-time, on-line state change notifications from members of the user's contact list.
Delivering real-time messages to other users.
Receipt of asynchronous, real-time messages from other users.
Configuring the user's access permissions, to restrict the ability of other users to view the user's on-line state or send messages to the user.

The IM service provides a variety of functionality to connected clients. For example, the IM service maintains state changes (e.g. client is on-line, client is offline, client is idle). Additionally, the IM service acts as a switch board through which clients can establish communication sessions without requiring a direct network connection between clients. When a client wishes to communicate with another client, it sends a message to the IM service, which then sends a message to the "destination" client to connect to session with the sending client.

Commands issued from a client to the IM server that result in a reply are known as requests. Requests are entirely asynchronous. The client can submit several requests in sequence without waiting for the server response after submitting each request. The server delivers a response or an error for each request received, but does not necessarily deliver the responses in the same order as the requests were received.

IM services typically use user handles for identifying users. A user handle (also known as "account name" and "logon name") is a representation of the user's identity that is both unique and persistent. The user handle is usually equivalent to an e-mail address.

SUMMARY OF THE INVENTION

The invention contemplates systems, methods and protocols for collaboratively executing an application. Initially a plurality of computing objects, such as instant messenger clients, establish a communication with an intermediary system such as an instant messenger service. The intermediary multicasts messages among the plurality of computing objects in communication with the intermediary where the messages constitute real-time communications among the various computing objects and users thereof.

A message indicative of an invitation to collaboratively execute an application can be sent from one of the computing object to the intermediary system whereby the message is multicast to the other ones of the plurality of computing objects. The invitation message can be accepted by the other computing objects to cause the first object to launch the corresponding application. The other computing objects also launch versions of the application and exchange addressing information with the first application so that a multiparty application execution can be established.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 1:
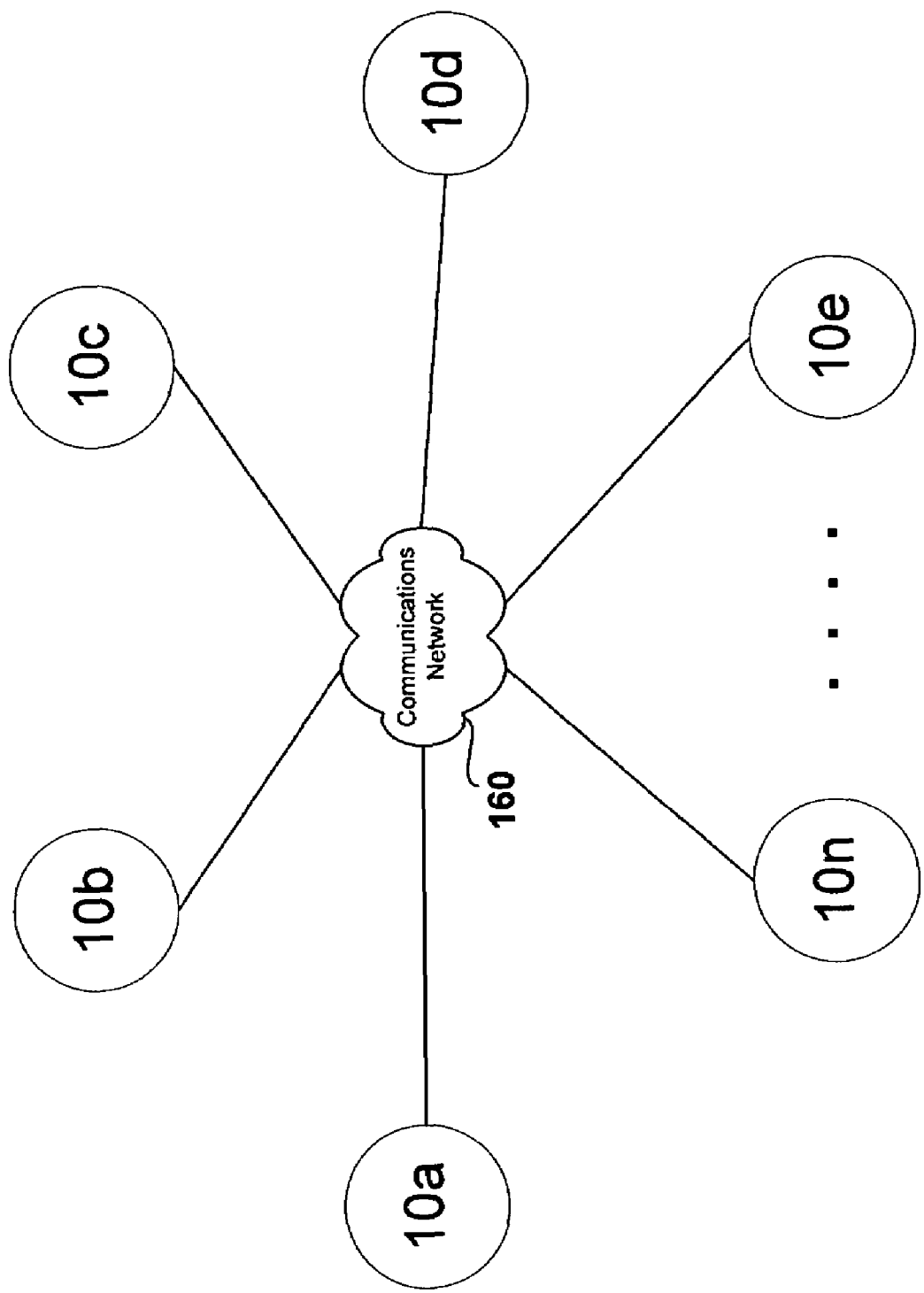
FIG. 1 is a diagram of an exemplary distributed system in which various objects communicate with each other in a communications network.

FIG. 1 provides a schematic diagram of a distributed computing environment. The distributed computing environment comprises computing objects 10A-10n. These objects may comprise programs, methods, data stores, programmable logic, etc. The objects comprise portions of the same or different devices such as PDAs, televisions, cell phones, personal computers, etc. Each object can communicate with another object by way of the communications network 160. This network may itself comprise other computing objects and computing devices that provide services to the system of FIG. 1. In a distributed computing architecture, computers that may have traditionally been used solely as clients communicate directly among themselves and can act as both clients and servers, assuming whatever role is most efficient for the network.

Computing Environment

Figure 2:
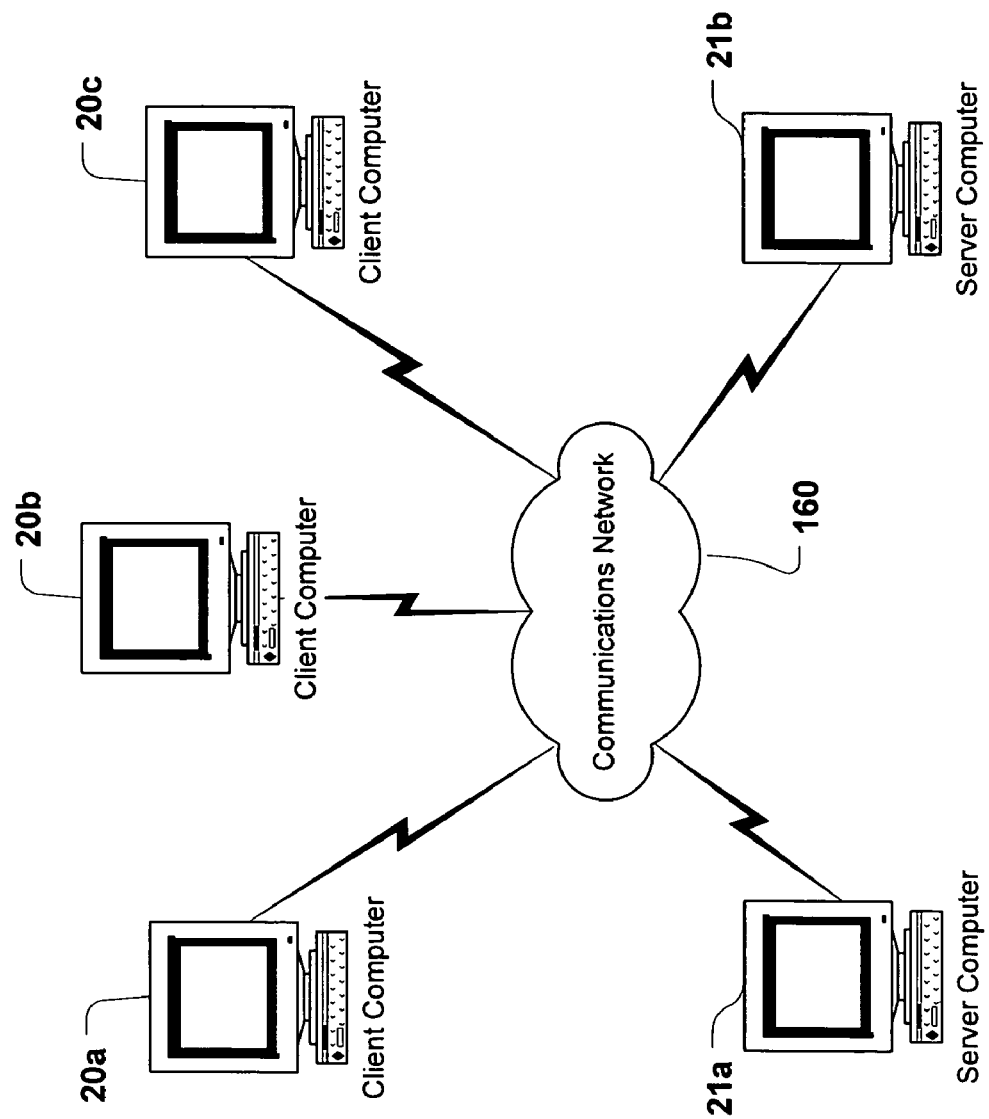
FIG. 2 is an example of a computer network wherein aspects of the present invention may be employed.

FIG. 2 illustrates how the objects of FIG. 1 may be implemented in a physical environment. Here computers 20a-20c and 21a-21b may host various ones of the objects of FIG. 1.

Although the physical environment shows the connected devices as computers, such illustration is merely exemplary and may comprise various digital devices such as PDAs, televisions, cell phones, personal computers, etc. Moreover, communications network 160 may itself comprise a number of computers and network devices such as routers and the like, which also may be capable of hosting objects 10 and/or providing services to objects 10.

There are a variety of systems, components, and network configurations that support distributed computing environments. For example, computing systems may be connected together by wireline or wireless systems, by local networks or widely distributed networks. Currently, many of the networks are coupled to the Internet which provides the infrastructure for widely distributed computing and encompasses many different networks.

In networking environments, there are at least four disparate network transport media that may each support a unique protocol such as Power line, data (both wireless and wired), voice (telephone) and entertainment media. Data Services are provided as broadband (e.g., Fiber, DSL, Cable, etc.) and is accessible using either wireless (e.g., 802.11b) or wired (Ethernet, Home PNA, Cat 5, even power line) connectivity. All of these network environments may be interconnected to form a network or intranet that may be connected to other devices and networks by way of the Internet.

The Internet commonly refers to the collection of networks and gateways that utilize the TCP/IP suite of protocols, which are well-known in the art of computer networking. TCP/IP is an acronym for "Transport Control Protocol/Internet Protocol." The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

The network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server). In the example of FIG. 2, computer 20 can be thought of as the client and computer 10 can be thought of as the server where server 10 maintains the data that is then replicated in the client computer 20.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Illustrative Computer Network Environment

In general, the computer network may comprise both server devices and client devices deployed in a network environment (in a peer-to-peer environment devices may be both clients and servers). FIG. 2 illustrates an exemplary network environment, with server computers in communication with client computers via a network, in which the present invention may be employed. As shown in FIG. 2, a number of servers 21a, 21b, etc., are interconnected via a communications network 160 (which may be a LAN, WAN, intranet or the Internet, or a combination of any of these) with a number of client computers 20a, 20b, 20c, etc. Moreover, communication network 160 may comprise wireless, wireline, or combination wireless and wireline connections.

Thus, the present invention can be utilized in a computer network environment having client computers for accessing and interacting with the network and a server computer for interacting with client computers. However, the systems and methods of the invention can be implemented with a variety of network-based architectures, and thus should not be limited to the example shown. The invention will now be described in more detail with reference to an illustrative implementation.

Figure 3:
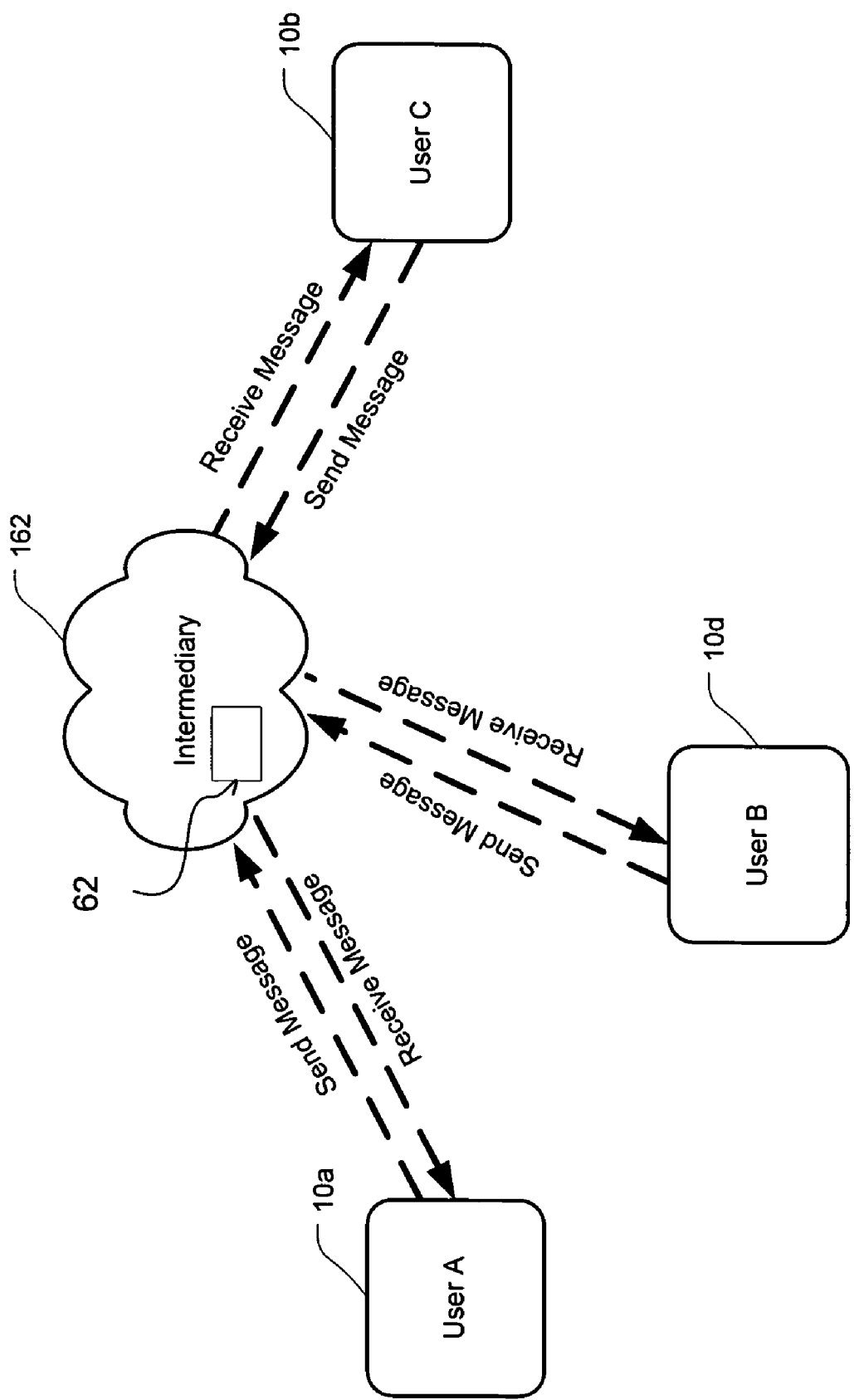
FIG. 3 is an illustration of objects within the distributed computer network communicating by way of an intermediary.

FIG. 3 illustrates a further aspect of the inventing system of the present invention. An object 10a may connect to a network service represented by intermediary 162 so that the object 10a and the intermediary 162 can exchange messages as indicated by the dashed lines. Similarly objects 10b and 10c may also connect to the network service represented by intermediary 162.

Intermediary 162 keeps track of the objects 10a, 10b, 10c, etc. that have connected to the intermediary 162. By tracking the various objects, 10a, 10b, 10c, intermediary 162 can provide information to objects in the network regarding the status of objects 10a, 10b, 10c, i.e. whether the objects are connected, unconnected, etc. and can facilitate communication among the various objects 10a, 10b, 10c. In general, intermediary 162 acts as a proxy between objects 10a, 10b, and 10c allowing various objects to communicate with each other without regard to location, computing device type, etc.

Because of the intermediary, the network system can be used as a virtual communications portal. Whereby a user can connect to the intermediary at any one of a variety of computing devices and make its presence know to the network and other objects in the network. When the intermediary functions as a communications portal allowing various objects to conduct real-time messaging, such systems are generally referred to as "instant messaging" or IM services.

An IM service can be either device-based or network-based. The IM services allow a user to create contact lists of other users whose presence on the network the user wants to know about. In a device-based system, the user contact list information is stored on the device used to access the system. Here for example, the object, such as object 10a, would store the contact list information. The user downloads an object 10 to a computing device, such as a personal computer. The user's list of contacts and other preferences specific to the user are saved on that computer. If the user accesses the intermediary 162 from multiple devices—a home computer and an office computer—the same user information will have to be created on each device.

In a network-based system, the user contact list is stored on a network-based server, so users have access to the same services and information, no matter how or where they access the system. Client software is loaded on a computing device and used to access the intermediary 162. The contact list, addresses, and other personal information is stored on the network, e.g., by intermediary 162, and is available whenever users log into the system. Hence, when a user logs into the system an object, e.g., 10a, is created where ever the user logs in. Users have the same information and the same services whether logging on from their home computers, office computers, or mobile phones.

Invitation to Collaborate

Figure 4A:
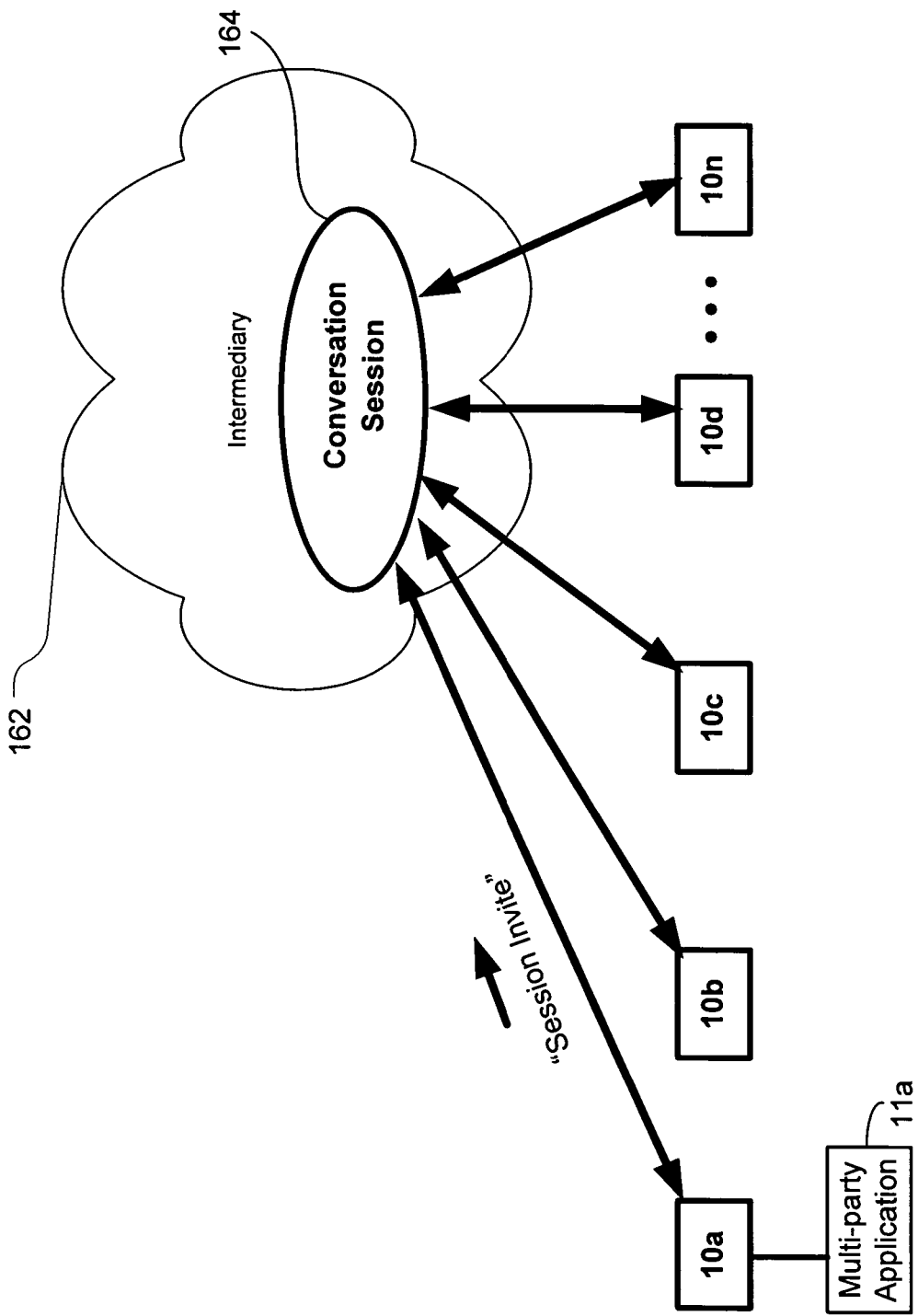
FIG. 4A-4C are illustrations of the invitation mechanism in accordance with an aspect of the invention.

FIG. 4A further illustrates aspects of the invention. In particular, objects 10a-10n have joined in a single conversation session that is maintained by intermediary 162. Intermediary 162 maintains a conversion session 164 that keeps track of information about the various objects 10a-10n such as IP addresses, login names, status, and so on. According to an aspect of the invention, an application 11a registers with the intermediary 162, or object, e.g., 10a. The registration is indicative that the application is capable of being used in a multiparty session invite environment.

Thereafter, a user (e.g., using object 10a) who wants to start the registered multiparty application 11a invites others to a conversation session 164. To start the invite, the object, e.g., 10a, sends a "Session Invite" to others for conversation (if already in a conversation, this step would be unnecessary). The "Session Invite" message is sent to Intermediary 162. Intermediary 162 then broadcast the message to the selected user objects indicating that user of object 10a wants to start a conversation. Here for example, object 10a invited a number of users who have joined the conversation via objects 10b through 10n. Object 10a need not know the IP address of the various other objects because intermediary 162 maintains the contact information for the various objects 10a-10n that are part of the session 164.

Figure 4B:
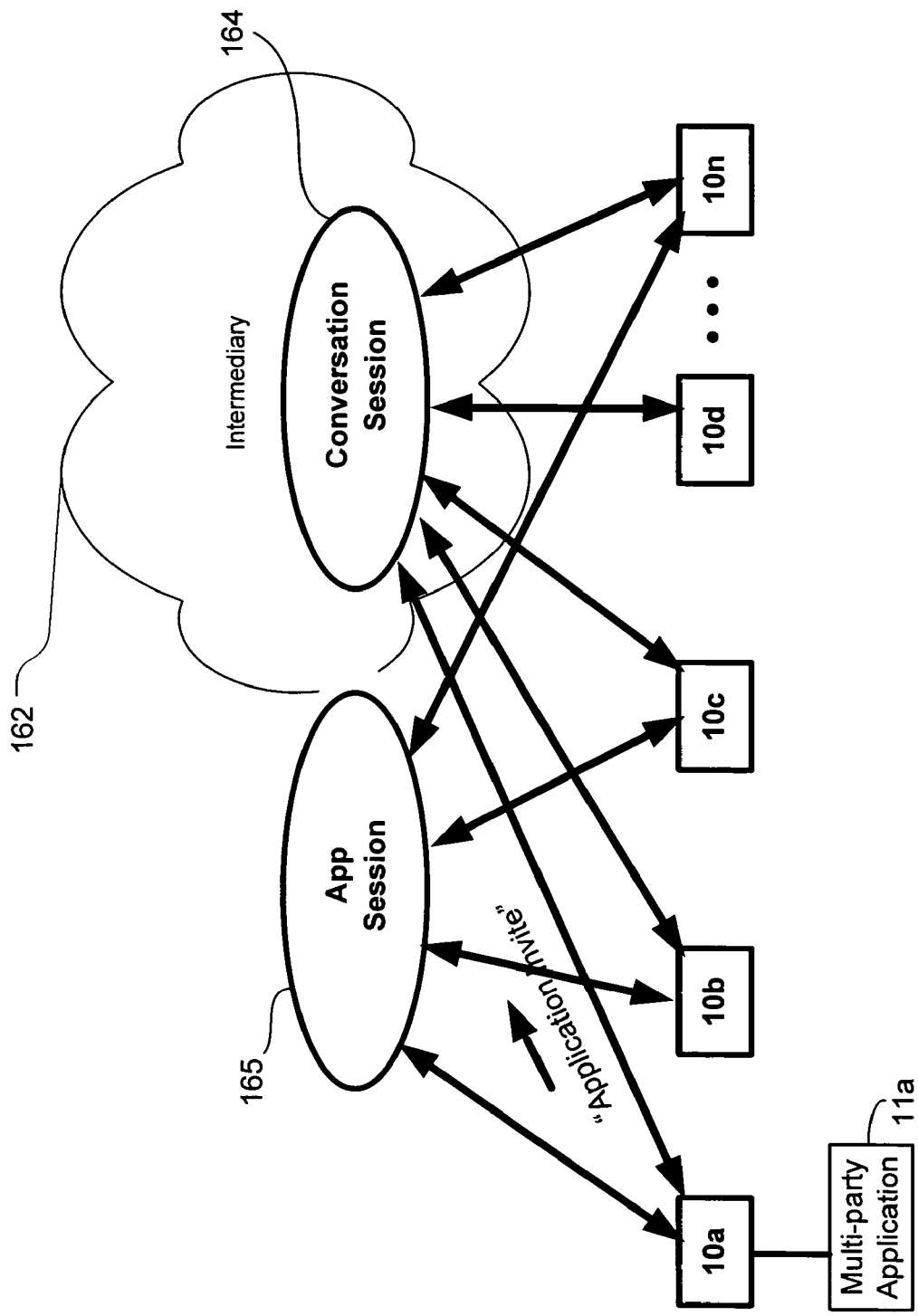

As shown in FIG. 4B, after the conversation session has started, user of object 10a sends "Application Invite" to the other user objects 10a-10n by way of the conversation session. An exemplary message contains information such as:

MSG TrID N bytes
MIME-Version: 1.0
Content-Type: text/msmsgsnwayinvite; charset=UTF-8
Recipient: UserHandle The above exemplary message is a MIME message and contains the following information: the first line has a "transaction ID" (TrID) to distinguish it from other messages, and enumerates how large the message is (in bytes). The subsequent lines have MIME information indicating that this plaintext message is an "Application invite" intended for the recipient marked in UserHandle.

Each user that wants to join the multiparty application responds over the conversation session with a similar packet, containing the accept status:

NAK (multiparty application, or this particular application, not supported on recipient's side)
ACCEPT
CANCEL At this point, there are potentially two sessions with different rosters of users: one, the conversation roster (the original conversation session roster), and, two, the multiparty application session roster (people who accepted the application invite, and consequently, support multiparty-specific features). The application session is indicated in FIG. 4B as App Session 165. The application session 165 can be maintained separately by the intermediary 162, or one or all of object 10a-10n, or merged with the conversation session to name but a few techniques for maintaining the application session 165.

For those users who accepted the application invite, the object 10a sends each of them contact information such as IP address or other connection information for object 10a. In this way, the various objects that accept the application invite no longer need the intermediary 162 to contact object 10a although they may still use intermediary 162 for communication. Notice in FIG. 4B that object 10d did not join the application session 165 although it remains connected to conversation session 164 and can continue to communicate with the various other objects by way of that conversation session. Object 10d may have opted out of the application session for a variety of reasons such as not wanting to join the multiparty application or not having a local copy of the multiparty application available.

After a participant has accepted a multiparty application invite, that participant launches a copy of the application locally. The application also queries it's corresponding object (e.g., 10b) for the application session pointer (e.g., application session 165). An example of an API for the query is shown below:

IMsgrSessionManager::GetLaunchingSession (LONG IProcessID, Dispatch** ppAppSession);

Here, IProcessID refers to the ID of the application's process. When the application queries the object, the latter looks up this ID in its table of launched applications, and if it matches a valid session, it returns a pointer to that session by storing it in the ppAppSession section.

Figure 4C:
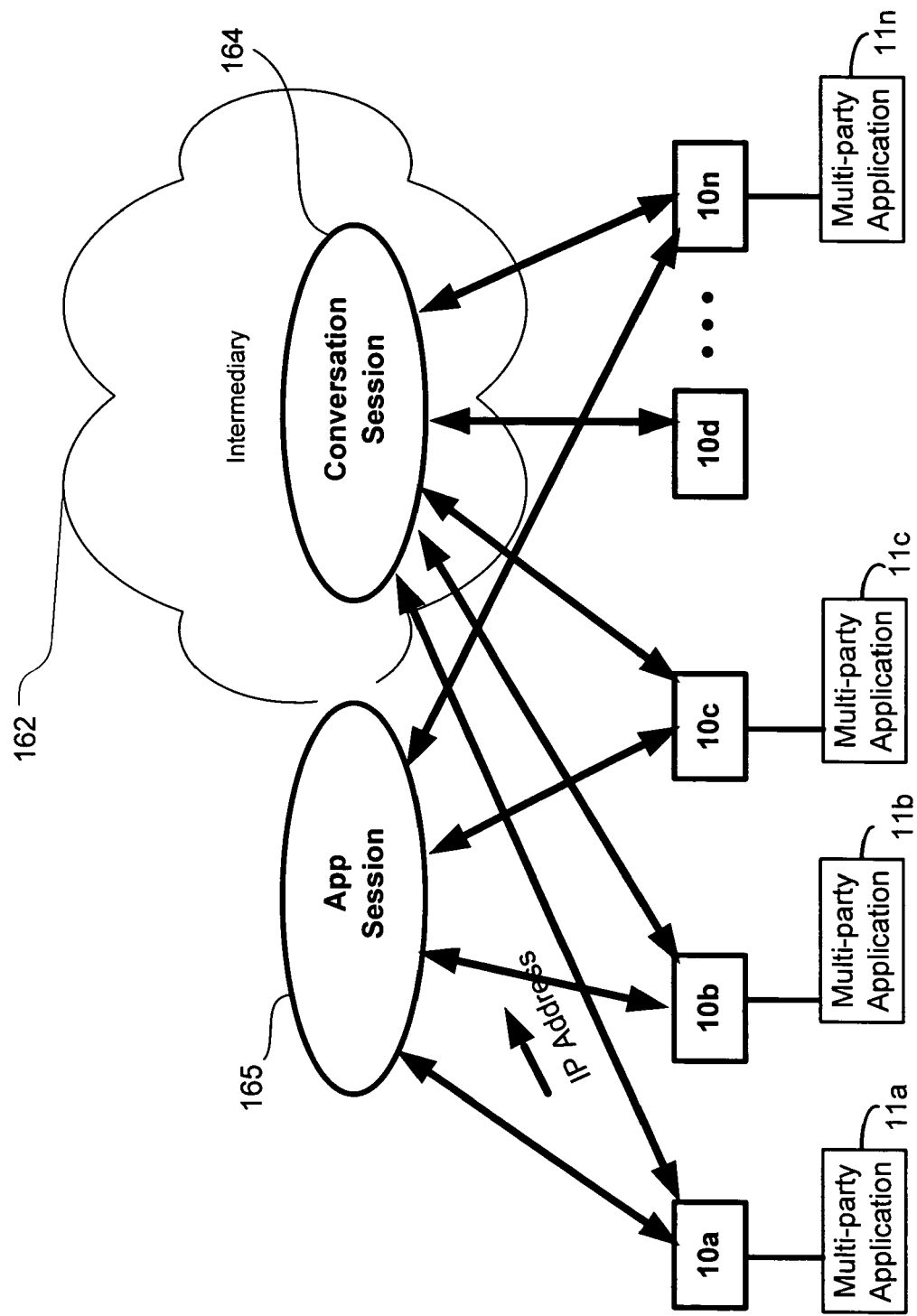

FIG. 4C illustrates the state of the session following the acceptance and launch sequence. Notably, all of the applications 10b, 10c, 10n that have joined the application session have launched corresponding versions of the multiparty application e.g., 11b, 11c, 11n, respectively. At this point, the application session has been setup and the various applications have the IP address for the various other objects. The various objects have launched applications and are ready to start the multiparty application. Object 10d, which opted out of the application session, may continue to participate in the conversation session.

Optionally, additional user objects may be invited to join the application session. The steps would be similar to those outlined above for starting the initial application session. One of the user's that is part of conversation session 164 would first invite a new participant to join conversation session 164 as outlined above. After joining the conversation session, all of the objects 10a-10n become aware of the presence of the new user. Thereafter, a participant in application session 165 may invite the new participant to join application session 165 using an "Application Invite" message. Note that the application invite message may also be re-sent to object 10d by one of the application participants. The mechanism for who from a conversation session can be invited to join an application session can be part of an application policy determined based on a variety of factors including security, application characteristics, etc.

The launched apps can send messages over the app session using the usual conversation message system. To this end, a SendContextData message includes a "from" parameter that indicates the source of the message. If messages that are broadcast are related to the application, the objects, e.g., 10a, 10b, etc. will not attempt to use the message as part of the conversation session and will instead direct the message to the multiparty application.

When various objects 10a-10n launch application session related events, it is possible that the multiparty application has not yet launched (due to latency). To ensure that the application does not lose these events, the object 10a-10n preferably caches those events until the application starts. This should be transparent to the application (i.e. it should receive the cached events like any regular events).

Figure 5:
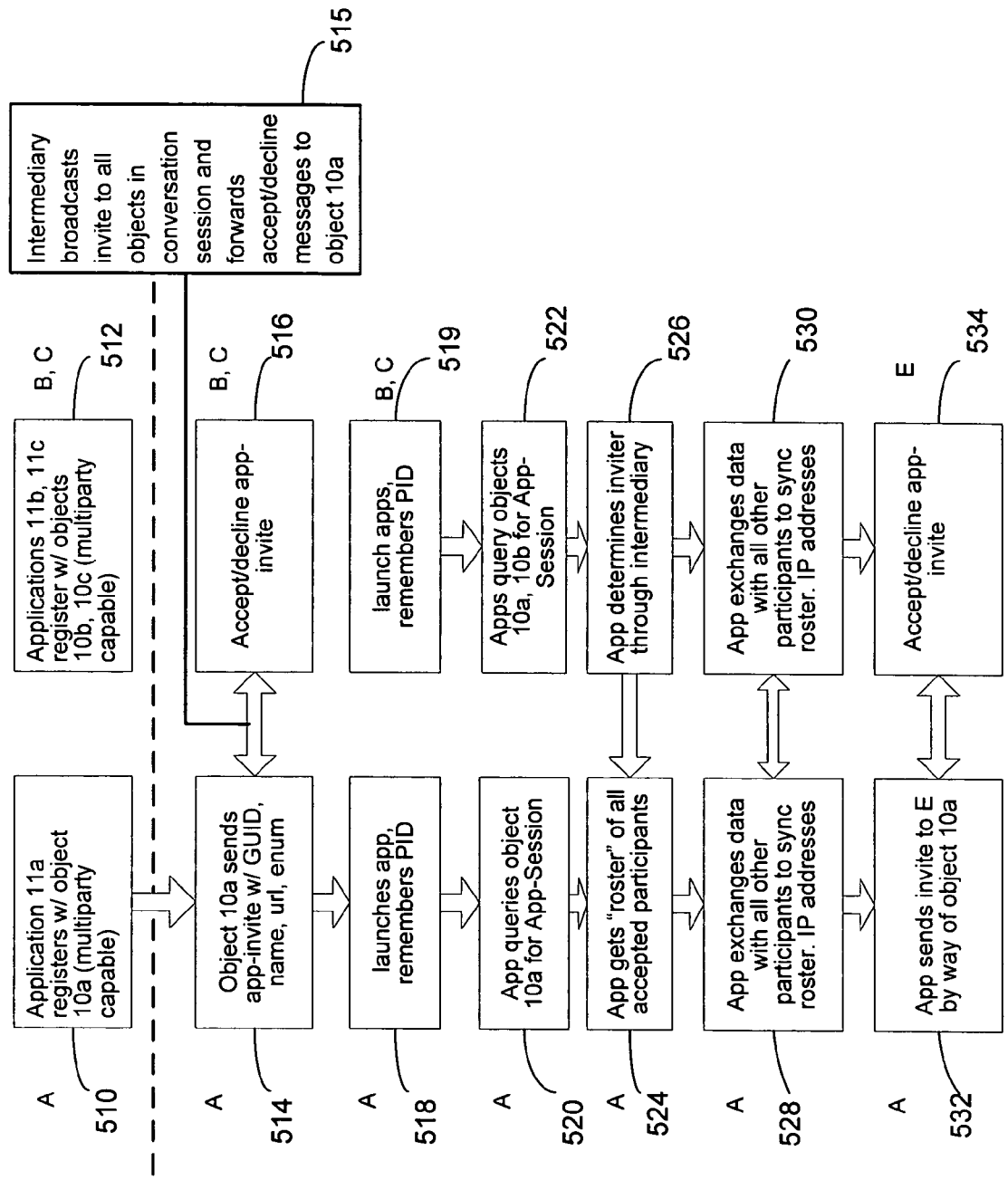
FIG. 5 is a flow diagram that illustrates the sequence of events during a multiparty invitation.

FIG. 5 further illustrates the steps associated with the multiparty invite mechanism. Initially, applications register as multiparty capable with their respective objects (510, 512). Thereafter, a user of object 10a initiates an invite to all of the users of objects on the conversation session (514). The invitation is sent to the intermediary 162 which in turn broadcasts the invite to all of the objects in the session (515). The users that want to join the application then send the accept to the initiating object through the intermediary (516). After receiving an acceptance, the initiating object launches the application (518). The accepting objects launch the application as well (519). At that point, the application has been launched by each object wherein a user wishes to participate in the multiparty application. Each application then determines the application session such as by querying the launching object (520, 522). The application on the initiating object obtains the roster of objects that have joined the application session (524) and the accepting applications determine the initiating application through the intermediary (526). Thereafter, each application can send connection-related data (including, but not limited to IP Address, servers, etc) so that each application can communicate directly or indirectly with each other application (528, 530).

The invention additionally contemplates that other user objects can be invited to join the application session. If for example, E joined the conversation session, any one of the user's in the application session could invite E to join in a similar fashion to that described above with respect to the initial set up (532, 534).

Figure 6:
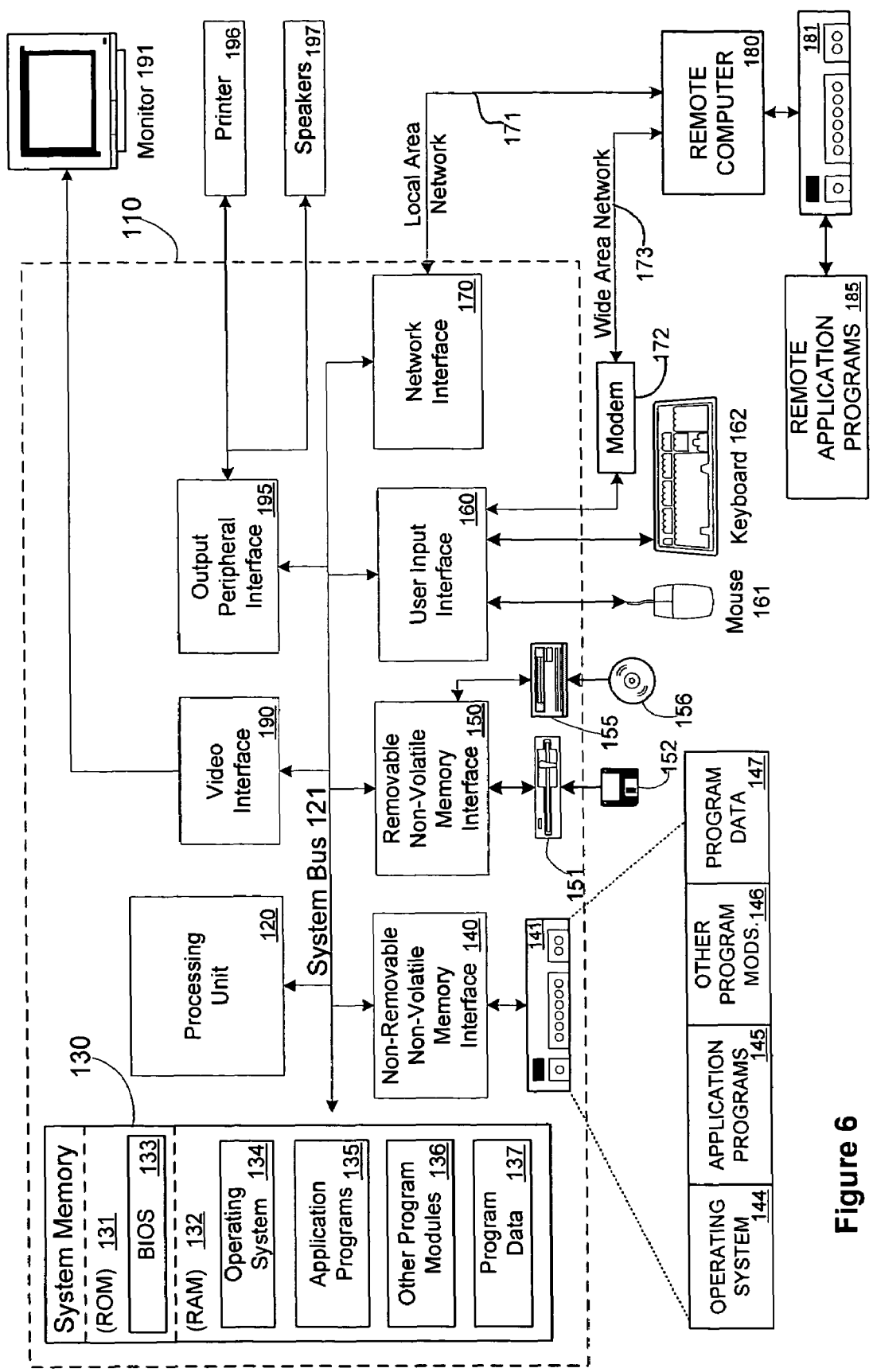
FIG. 6 is a block diagram of an exemplary computing environment in which aspects of the invention may be implemented.

With reference to FIG. 6, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

Computer 110 may also include other removable/non-removable, volatile/nonvolatile computer storage media. By way of example only, FIG. 6 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 6, provide storage of computer readable instructions, data structures, program modules and other data for the computer 110. In FIG. 6, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices may include a microphone 163, joystick, game pad, satellite dish, scanner, or the like (not shown).

These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 6. The logical connections depicted in FIG. 6 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 6 illustrates remote application programs 185 as residing on memory device 181. It will be appreciated that the network connections shown are exemplary and other means of establishing a communications link between the computers may be used.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices such as personal computers and PDAs, one skilled in the art will recognize that the present invention is not limited to such digital devices, as described in the present application may apply to any number of existing or emerging computing devices or environments, such as a gaming console, handheld computer, portable computer, home appliances, etc. whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed:

1. A computer implemented method for collaboratively executing an application, comprising:

establishing a communication from a first computing object to an intermediary system wherein the intermediary multicasts messages among the first computing object and a plurality of other computing objects in communication with the intermediary wherein the first computing object and the plurality of other computing objects can communicate text messages wherein the computing objects have computing memory communicatively coupled to a processor;

transmitting a message by way of the established communication indicative of an invitation to collaboratively execute an application from the first computing object to the intermediary system whereby the message is multicast to the plurality of other computing objects and wherein each of the plurality of other computing objects launches a first application;

receiving a message indicative of acceptance at the first computing object from at least a subset of the plurality of other computing objects;

receiving a network address of the at least a subset of the plurality of other computing objects that sent a message indicative of acceptance whereby the first computing object transmits actions related to the first application to the at least a subset of the plurality of other computing objects to communicate actions performed on the application locally bypassing the intermediary and wherein the communication session is maintained with the intermediary for multicasting text messages among the first computing object and the plurality of other computing objects;

launching the first application locally, wherein the act of launching the first application comprises both transmitting a parameter indicative of an identifier of a process of the first application and receiving a pointer to an application session of which the first application is associated.

2. The method of claim 1 wherein the message indicative of an invitation comprises the term "invite".

3. The method of claim 1 wherein the first computing object is executing on a first computer and wherein the other ones of the computing objects is executing on at least one other computer.

4. The method as recited in claim 1 further comprising registering a first copy of the application with the first computing object.

5. The method as recited in claim 1 wherein a first copy of the application and the first object are executable on a first computer.

6. The method as recited in claim 5 further comprising transmitting a message from the first computer indicative of connection-specific information to the at least ones of the plurality of other computing objects.

7. The method as recited in claim 6 wherein the connection-specific information comprises an internet protocol address.

8. The method as recited in claim 6 further comprising launching a second application on a second computer.

9. The method as recited in claim 8 wherein the second application and the first application comprise compatible functions.

10. The method as recited in claim 9 wherein the second application is the same application as the first application.

11. The method as recited in claim 1 further comprising transmitting a second message to another computing object that joined the communication with the intermediary, the second message indicative of an invitation to collaboratively execute the application.

12. The method as recited in claim 11 wherein the another computing object joined the communication with the intermediary after the first message was transmitted.

13. The method as recited in claim 11 wherein the transmission of the second message is by one of the plurality of other computing objects.

14. A computer-readable medium having stored thereon computer readable instructions for carrying out the acts recited in claim 11.

15. A system for collaborative application execution, comprising:
   a first computer comprising intermediary computer readable instructions for multicasting messages among a plurality of computing objects;
   at least one of the plurality of computing object in communication with the intermediary computer-readable instructions and comprising a plurality of computer-readable instructions for real-time communication with other computing objects by way of the intermediary computer-readable instructions; and
   at least one of the plurality of computing objects comprising computer readable instructions for inviting computing objects by way of real-time communication to collaboratively execute a computer application by way of the intermediary computer-readable instructions
   at least one of the plurality of computing readable instructions for communicating directly with a network address of at least one other computing device simultaneously executing the collaborative application to which actions are transmitted related to the collaborative application bypassing the first computer and wherein the real-time communications not related to actions in on the collaborative application continue to use the computer-readable instructions multicasting text messages with other computing objects by way of the intermediary computer-readable instructions.

16. The system as recited in claim 15 wherein the first computer comprises a roster of users that have communicated their presence through a computing object to the intermediary instructions.

17. The system as recited in claim 15 wherein the first computer maintains a session indicative of users that have joined in a real-time communication.

18. The system as recited in claim 16 further comprising an application session that maintains a roster of users that are collaboratively executing an application.

19. The system as recited in claim 18 where each user causes a copy of the application to be executed on a separate computer from each other user.

20. An instant messaging service comprising the intermediary computer-readable instructions as recited in claim 15.

* * * * *